Figures 1, 4, 5:
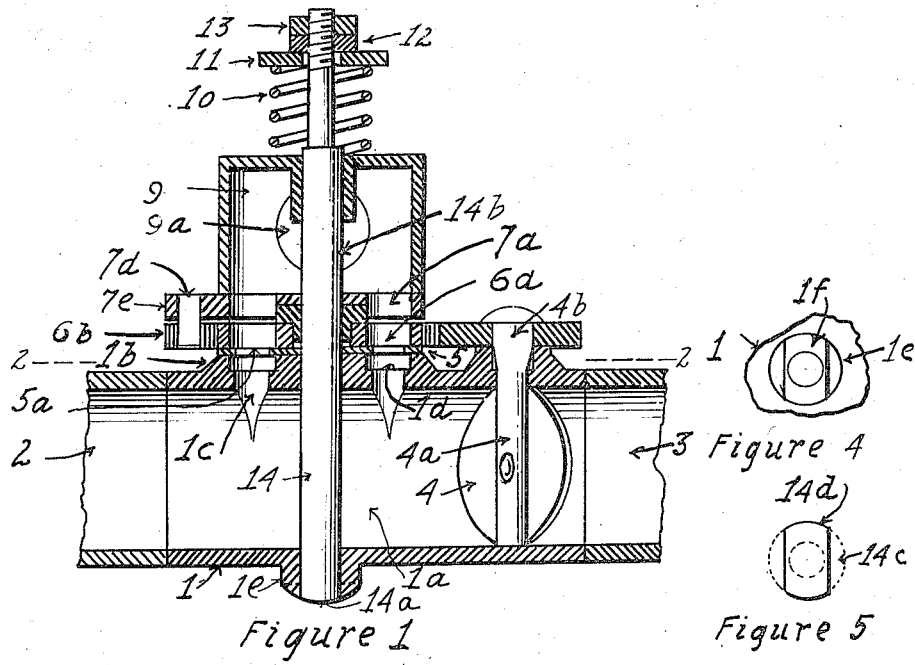

April 12, 1938. E. D. PEERSTONE 2,113,925
SUPPLEMENTARY AIR MIXERS FOR INTERNAL COMBUSTION ENGINES
Original Filed Dec. 10, 1932  2 Sheets-Sheet 1

Inventor
Earl D Peerstone

April 12, 1938. E. D. PEERSTONE 2,113,925
SUPPLEMENTARY AIR MIXERS FOR INTERNAL COMBUSTION ENGINES
Original Filed Dec. 10, 1932  2 Sheets-Sheet 2

Inventor
Earl D Peerstone

Patented Apr. 12, 1938

2,113,925

UNITED STATES PATENT OFFICE 2,113,925

SUPPLEMENTARY AIR MIXER FOR INTERNAL COMBUSTION ENGINES

Earl D. Peerstone, Chicago, Ill.

Application December 10, 1932, Serial No. 646,697
Renewed April 22, 1937

19 Claims. (Cl. 277—19)

The purpose of this improvement is to provide means for increasing the degree of richness of the explosive mixture of gas and air during periods of speed or power acceleration, when a richer mixture is desirable, without sacrificing the factor of economy during periods of ordinary operation, or, in other words, this improvement is designed to prevent any thinning of the mixture when, with a rapid advance of the throttle valve and with the engine not yet up to speed, and with the supplementary air valve open, the admission of supplementary air might, except for this improvement, result in producing too lean a mixture during such periods.

This improvement may be incorporated in the carbureter design in lieu of the ordinary auxiliary air valve or it may be provided as an auxiliary part with existing carbureters. It may be used with any type or construction of supplementary air valve but is particularly intended for use with that type of carbureter, or supplementary air mixer, providing a progressively varying degree of opening of the supplementary air inlet, during the opening movement of the throttle valve, for the purpose of correcting undesired variations from ideal, or preferred, mixture proportions.

This purpose is accomplished by the introduction of a novel mechanism for the operation of a secondary valve, for controlling the supplementary air inlet, and for governing the operation of both the supplementary air valve and the throttle valve, having a lost motion relative to the supplementary air and throttle valves, permitting a movement of the secondary valve while the other valves are maintained in any desired position. This intermediate movement of the secondary valve permits the secondary valve to be advanced, during periods of speed and power acceleration, to a position relative to the supplementary air valve where the secondary valve covers and practically closes the ports in the supplementary air valve, thereby preventing the admission of supplementary air and insuring a maximum degree of richness of mixture, and this position is maintained as long as may be required, after which the secondary valve is reversed a short distance to its open position relative to the supplementary air valve, while the supplementary air valve and the throttle valve remain stationary, with the result of again opening the ports in the supplementary air valve, permitting the admission of supplementary air into the mixture, with the consequent thinning of the mixture to preferred proportions, as governed by the design of the ports in the supplementary air valve.

With this improved type of supplementary air control it is also possible, whenever desired, to operate at any rate of speed, or throttle position, with the supplementary air inlet closed, at times when a richer mixture would be preferable, as when warming-up an engine during cold weather.

Figures 2, 6:
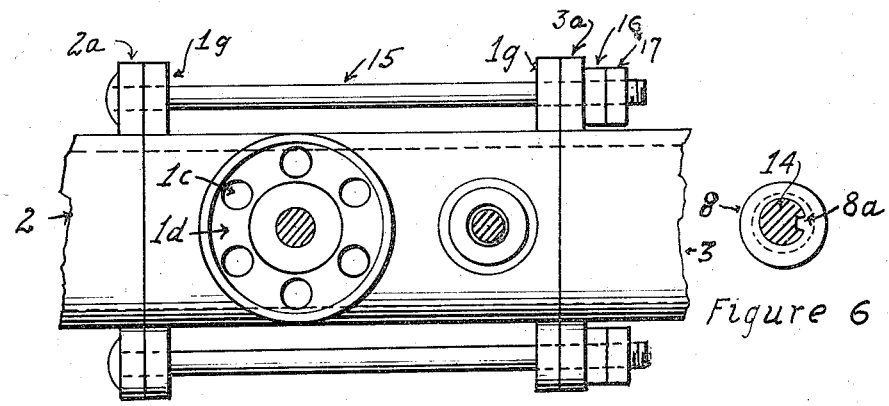
Figure 3:
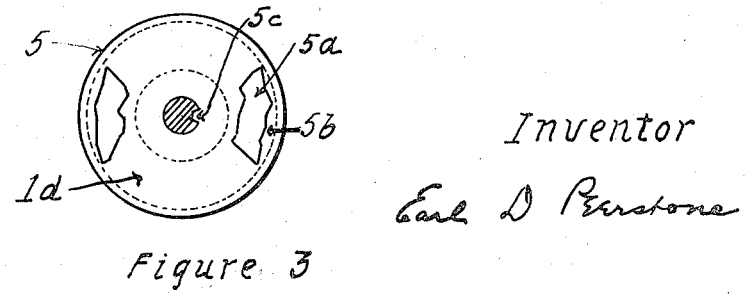
Figure 7:
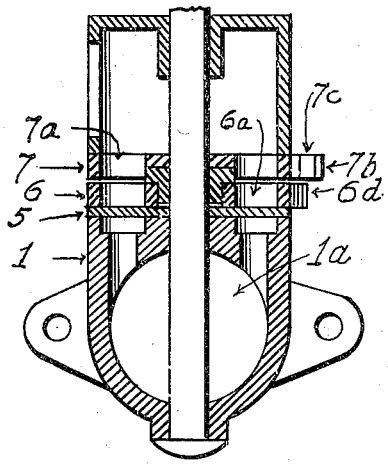
Figure 8:
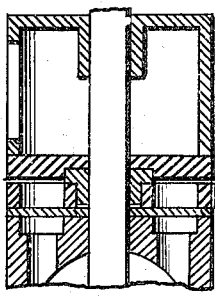
Figure 9:
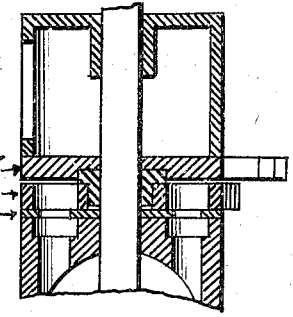
Figure 10:
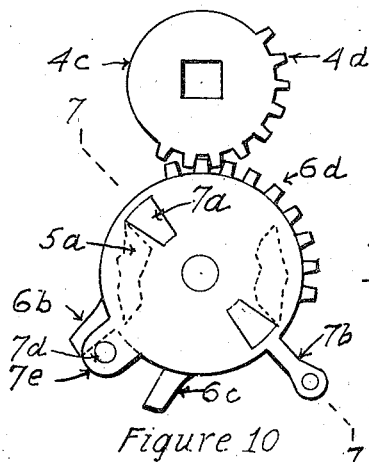

Referring to the drawings, Figure 1 is a longitudinal vertical section through the device, which in this set of drawings is shown as an auxiliary part adapted for use with an existing carbureter, and when so used it will be necessary to remove the throttle valve provided with the carbureter and use instead the throttle valve provided with the auxiliary part. Figure 2 is a plan view, on line 2—2 of Figure 1. Figure 3 is a plan view of the supplementary air valve seat, showing same as superposed above the distributing chase of the part below. Figure 4 is a detail showing the lower face of the lower boss of part 1. Figure 5 is a detail showing the head of the pivot bolt, 14. Figure 6 is a plan view of the stationary washer, 8. Figure 7 is a transverse vertical section through that portion of the device more particularly affecting the control of the admission of the supplementary air supply, taken along line 7—7 of Figure 10, showing the secondary valve ports in register with the supplementary air valve ports, but with the ports in the supplementary air valve out of register with the supplementary air inlets formed in the valve seat, being the closed position of the supplementary air valve. Figure 8 is a fractional portion of a transverse vertical section, taken along line 8—8 of Figure 11. Figure 9 is a fractional portion of a transverse vertical section, taken along line 9—9 of Figure 12. Figures 10, 11, 12 and 13 are plan views of the secondary valve, shown as superposed upon the supplementary air valve and the supplementary air valve seat, being complementary to the sections shown in Figures 7, 8, 9 and 14, respectively, as more fully described below. Figure 14 is a fractional portion of a transverse vertical section, taken along line 14—14 of Figure 13.

The device consists of a housing, 1, forming a supplementary air chamber, or secondary mixing chamber, 1a, having connection and communication with the mixing chamber of a carbureter, not shown but fractionally indicated at 2, and having connection and communication with the engine by means of a manifold, not shown but fractionally indicated at 3, and thereby providing a passage for the movement of the mixture from the mixing chamber to the engine. A throttle valve, 4, controls the discharge of mixture from the supplementary air chamber, 1a, into the manifold, 3.

A boss, 1b, is formed at one end of the top of the housing, 1, in which boss are formed distributing passages, 1c, through which the supplementary air is diffused throughout the supplementary air chamber, 1a. A chase, 1d, of annular shape, is formed in the upper face of the boss, 1b, and serves as a passage for the movement of supplementary air between the inlet ports, 5a, formed in the supplementary air valve seat, 5, and the distributing passages, 1c.

As indicated in the drawings the supplementary air inlets, 5a, formed in the supplementary air valve seat, 5, have an irregular outline, or perimeter, 5b, the meandering profile, or contour, of which provides, in connection with the travel of the ports, 6a, of maximum area, formed in the supplementary air valve, 6, a progressively varying degree of registry between the ports, 6a, and the irregular contour of the inlets, 5a, thereby progressively varying the degree of opening of the inlets during the forward movement of the supplementary air valve.

A secondary valve, 7, having ports, 7a, formed therein, is provided to optionally close, or cover, the ports, 6a, in the supplementary air valve, 6, during periods of speed acceleration or of maximum power requirements. The supplementary air valve, 6, and the secondary valve, 7, serve as primary and secondary movable members, respectively, in the formation of a duplex valve device for variably controlling the admission of supplementary air into the chamber through the supplementary inlet.

The ports, 6a, formed in the supplementary inlet valve, 6, have a certain relation to the lugs, 6b/6c, forming part of the supplementary inlet valve structure, being so positioned relative to the said lugs, which form a part of a slip connection between the supplementary inlet valve, 6, and the secondary valve, 7, as described below, that an initial forward, or advancing, movement of the secondary valve, 7, within the limits of the slip connection, will bring the secondary valve, 7, to a position in which the secondary valve, 7, will close, or blank, the ports, 6a, formed in the supplementary inlet valve, 6, thereby blanking the supplementary inlets, 5a, and a continuing forward movement of the secondary valve, 7, will forwardly actuate the supplementary inlet valve, 6, while maintaining the ports, 6a, closed, and thereby advance the supplementary inlet valve ports, 6a, relative to the valve seat ports, 5a, and will also forwardly actuate the throttle valve, 4, by means of the connection, 6d/4d, between the supplementary inlet valve, 6, and the throttle valve, 4, to effect any desired degree of opening of the throttle valve, while maintaining the closure of the ports in the supplementary inlet valve and the blanking of the supplementary inlets by the secondary valve.

Both the throttle valve, 4, and the supplementary air valve, 6, are operated by the same means, or mechanism, as the secondary valve, 7. An operating arm, 7b, having an opening, 7c, for the attachment of an operating rod, 18, extending to any preferred point of operation, is provided for the forward, or advancing, operation of the secondary valve, 7, and a lug, or pin, 7d, supported in and projecting from an extension, 7e, of the secondary valve structure, 7, being so positioned relative to the ports, 7a, that a rearward movement of the secondary valve, 7, within the limits of the slip connection described below, will bring the ports, 7a, into open registry with the ports, 6a, formed in the supplementary inlet valve, 6, and has a range of movement between, and a loose engagement with, two lugs, 6b and 6c, projecting from the supplementary air valve structure, 6, which are set at a predetermined distance apart, permitting a movement of the pin, 7d, from one of the lugs, 6b/6c, to the other, providing a lost motion between the movement of the secondary valve, 7, and the supplementary air valve, 6, during the travel of the pin, 7d, from lug 6b to lug 6c, or vice versa, permitting, during such lost motion of the secondary valve relative to the supplementary air valve, an adjustment of the secondary valve, 7, relative to the supplementary air valve, 6, having, during the advance or forward movement of the throttle and supplementary air valves, the function of bringing the secondary valve, 7, forward within the limits of the aforesaid slip connection to a position, relative to the supplementary air valve, 6, in which the ports, 7a, of the secondary valve, 7, are moved out of register with the ports, 6a, of the supplementary air valve, 6, as in this advanced position of the secondary valve relative to the supplementary air valve the solid portion of the secondary valve covers, and practically closes, the ports, 6a, in the supplementary air valve, and this closed relation between the secondary valve and the supplementary air valve is maintained as long as the throttle valve is being advanced, and as long thereafter as may be necessary to acquire the desired rate of speed, after which the secondary valve is reversed within the limits of the aforesaid slip connection to a position in which the ports, 7a, of the secondary valve register with the ports, 6a, of the supplementary air valve, permitting the resumption of normal functioning by the supplementary air valve.

Gear teeth, 6d, are formed along a portion of the peripheral edge of the supplementary air valve, 6, and intermesh with similar gear teeth, 4d, formed along a portion of the peripheral edge of the throttle valve operating disc, 4c, causing a simultaneous movement of the throttle and supplementary air valves. The throttle valve operating disc, 4c, is rigidly connected by a squared section, 4b, to the throttle valve stem, 4a, which is attached to the throttle valve, 4. By means of the intermeshing of the gear teeth, 4d and 6d, which causes the simultaneous operation of the throttle and supplementary air valves, and by means of the pin, 7d, and the lugs, 6b/6c, which cause the related, but intermittent, operation of the supplementary air valve by the secondary valve, a valve operating mechanism is provided for the operation of the three valves, having a fixed, or continuous, engagement, or connection, with the secondary valve and a slip, or intermittent, connection with the supplementary air and throttle valves, providing a lost motion of the valve operating mechanism relative to the supplementary air and throttle valves, during which lost motion the secondary valve may, by separate, or intermediate, movement be adjusted to a position relative to the supplementary air valve in which position the secondary valve practically closes the ports, 6a, in the supplementary air valve.

It is intended that forward or advancing movements of the operating mechanism shall be manually effected by means of an operating rod, 18, and that reverse movements shall be automatically effected by a spring, or yielding resistance means.

For this purpose a spring, 19, or other yielding resistance means, is attached to the operating rod, 18, and may be anchored to any suitable means, 20. The spring, 19, serves to oppose the forward movement of the operating rod, 18, and effects the reverse movement of the operating rod, 18, and the secondary valve, 7, when manual advancement, or maintenance, of these parts is relieved. As the spring, 19, is attached to the operating rod, 18, and is not directly engaged with the throttle valve as is ordinarily the case, the secondary valve, 7, may be shifted within the limits of the lugs, 6b/6c, without imparting any movement to the supplementary air valve, 6, or the throttle valve, 4, leaving both of these valves stationary while the secondary valve, 7, is moved from the position shown in Figures 9 and 12 to the position shown in Figures 13 and 14. As the spring, 19, during the movement of the secondary valve pin, 7d, between the limits of the lugs, 6b/6c, is in operative engagement only with the secondary valve, 7, no movement of the supplementary air valve, 6, or of the throttle valve, 4, can take place until the secondary valve pin, 7d, completes its movement between the lugs, 6b/6c, and engages with either one lug or the other, (which is dependent upon the direction of movement of the secondary valve, 7,) and it will thus be seen that the spring, 19, is effective with relation to the supplementary air valve, 6, and to the throttle valve, 4, only at such times as the pin, 7d, is in engagement with the lug, 6b, during the reverse movement of the operating rod, 18, and of the second valve, 7, and that the force of the spring, 19, is not applied to the reverse movement of the supplementary air valve, 6, and the throttle valve, 4, until the pin, 7d, has traveled from its forward engagement with the lug, 6c, to its reverse engagement with the lug, 6b.

Figures 10, 11, 12 and 14 indicate the relations between the secondary valve, the supplementary air valve, and the supplementary air valve seat, as discussed below.

In Figures 7 and 10 the supplementary air valve ports, 6a, are in register with the secondary valve ports, 7a, but the ports, 6a, are not in register with the inlet ports, 5a, formed in the valve seat, 5, and no supplementary air is admitted into the supplementary air chamber, 1a; this being the position of the valves after a full rearward, or reverse, movement to "closed" position.

Figure 11:
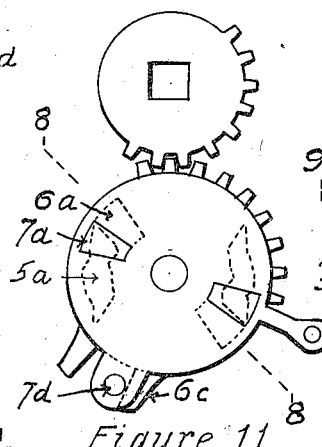

In Figures 8 and 11 is shown the first, or preliminary, movement for advancing the throttle and supplementary air valves; this movement being limited to the secondary valve, 7, which is moved to a position in which the ports, 7a, are out of register with the ports, 6a; the solid portion of the secondary valve thus blanking the ports, 6a. During this preliminary movement of the secondary valve the pin, 7d, has moved from its engagement with the lug, 6b, as shown in Figure 10, to an engagement with the lug, 6c, as shown in Figure 11. Up to this point there has been no movement of the throttle or supplementary air valves, which remain in the same position as in Figure 10.

Figure 12:
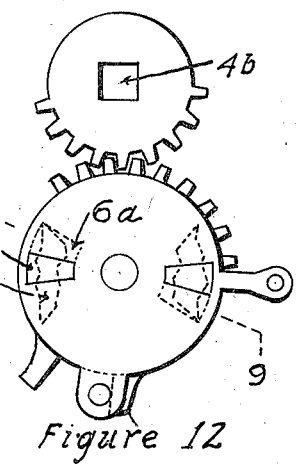

In Figures 9 and 12 is shown a further movement of the secondary valve which, owing to the engagement of the pin, 7d, with the lug, 6c, has also moved the supplementary air valve to a position in which the ports, 6a, are in register with a certain portion of the inlets, 5a, formed in the valve seat, 5, but as the ports, 7a, of the secondary valve, are still out of register with the ports, 6a, of the supplementary air valve, practically no supplementary air is being admitted. This relation between the secondary and supplementary air valves is maintained during advances of the throttle valve and as long thereafter as may be necessary to attain the desired rate of speed.

Figure 13:
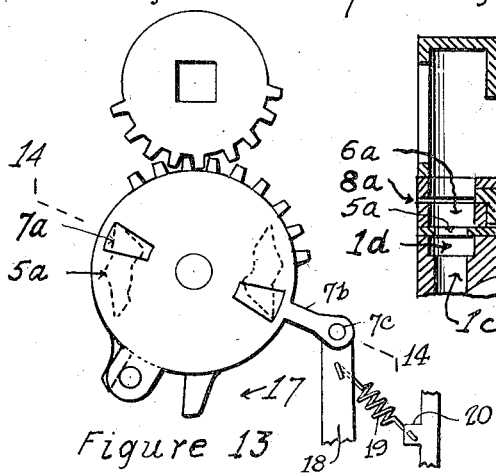
Figure 14:
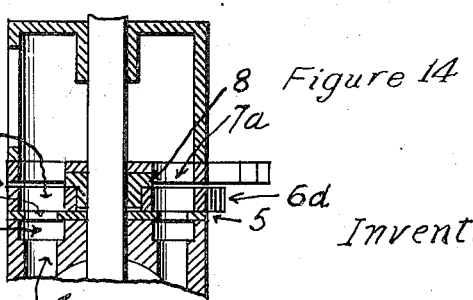

In Figures 14 and 13 the secondary valve has been reversed a short distance bringing the ports, 7a, into register with the ports, 6a, which are already in register with the inlets, 5a; in which position of the valves supplementary air is admitted into the supplementary air chamber, 1a, through the ports, 7a, and 6a, and inlets, 5a.

As the secondary valve, 7, has the function of closing, or blanking, the ports, 6a, formed in the supplementary inlet valve, 6, and thereby blanking the supplementary inlet, during the forward, or opening, movement of the throttle valve, 4, it is essential for the proper operation, or functioning, of this device, that the lower face of the secondary valve, 7, shall be contiguous to, although not necessarily in contact with, the upper face of the supplementary inlet valve, 6.

To prevent possible shifting of the supplementary air valve, 6, by frictional engagement with the secondary valve, 7, it is considered desirable to maintain a space relation, or void, forming a slit, or air space, 8a, being a slight clearance of a few thousandths of an inch, between the secondary valve, 7, and the supplementary air valve, 6, by means of a stationary washer, 8, seated in an annular recess, 6e, formed in the upper face of the supplementary inlet valve, 6; the thickness, or vertical height, of which has a relation to the amount of such clearance which it may be desired to maintain, as shown in Figure 14. This clearance, 8a, is intended to be sufficient to prevent frictional engagement between the supplementary and secondary valves but not enough to admit any appreciable amount of supplementary air through the slit thus formed between the secondary and supplementary air valves, so that for all practical purposes the blanking of the ports, 6a, by the movement of the secondary valve to the position shown in Figures 8 and 11, or 9 and 12, has the effect of practically closing the ports, 6a, and thereby preventing the admission of supplementary air into the supplementary air chamber, to a major extent.

A chamber, 9, having an inlet port, 9a, may, if desired, be provided for receiving heated air.

The various elements which are superposed upon the boss, 1b, are maintained in close operative engagement with each other by the pressure of a spring, 10, or other yielding resistance means, which may be adjusted to any desired degree of tension, having reaction between the top of the hot air chamber, 9, and a washer, 11, adjustably secured by a nut, 12, and a locknut, 13, attached by screw thread to the upper end of a bolt, 14, which extends vertically through the various parts, as indicated, and terminates at the bottom in a head, 14a, engaging a boss, 1e, formed at the bottom of the housing, 1.

The pressure of the spring, 10, creates a friction engagement between the supplementary air valve, 6, and the parts above and below same, operating to resist and oppose any independent movement of the supplementary air and throttle valves during the intermediate movements of the secondary valve.

As it is essential that the various parts utilizing the bolt, 14, as a central pivot shall have a certain positioning relative to each other a longitudinal keyway, 14b, is provided in the bolt, 14, to receive keys, 5c and 8a, formed in the supplementary air valve seat, 5, and the stationary washer, 8, respectively, and thereby prevent any rotary movement of these parts. To prevent any rotation of the bolt, 14, the bolt head, 14a, is deformed by the removal of certain portions, 14c, of the head flange, indicated in dotted lines, leaving certain portions, 14d, undisturbed, as shown in Figure 5. A slot, 1f, is formed in the lower boss, 1e, to receive the deformed head of the bolt, as shown in Figure 4, and when the head of the bolt is properly placed in the slot no rotary movement of the bolt is possible.

When developed as an auxiliary part, for use with an existing carbureter, the housing, 1, may be connected between the mixing chamber, 2, and the manifold, 3, by bolts, 15, which pass through lugs, 2a, attached to the carbureter, lugs, 1g, attached to the housing, and lugs, 3a, attached to the manifold, being secured by nuts, 16, and locknuts, 17.

Having thus described my invention, I claim:

1. A device of the class described, comprising a housing, forming a chamber, having a primary inlet, and having a supplementary inlet, and having a discharge outlet; a throttle valve for controlling the discharge outlet; means, by the forward actuation of which the supplementary inlet may be closed and the throttle valve may be opened, and by which the closure of the supplementary inlet may be maintained during the opening of the throttle valve; and yielding resistance means for opposing the closure of the supplementary inlet and the opening of the throttle valve.

2. A device of the class described, comprising a housing, forming a chamber, having a primary inlet, and having a supplementary inlet, and having a discharge outlet; a throttle valve for controlling the discharge outlet; means, by the forward actuation of which the supplementary inlet may first be blanked, and by the continuing forward actuation of which the throttle valve may be subsequently opened, and by which the blanking of the supplementary inlet may be maintained during the opening of the throttle valve; and yielding resistance means for opposing the forward actuation of the first mentioned means.

3. A device of the class described, comprising a housing, forming a chamber, having a primary inlet, and having a supplementary inlet, and having a discharge outlet; a throttle valve for controlling the discharge outlet; a supplementary inlet valve for controlling the supplementary inlet; a connection between the supplementary inlet valve and the throttle valve, for operating the throttle valve in unison with the supplementary inlet valve; means, having a forward movement for blanking the supplementary inlet and for forwardly actuating the supplementary inlet valve to effect a progression in the degree of opening of the supplementary inlet valve relative to the supplementary inlet, and for forwardly actuating the throttle valve, by means of the aforesaid connection between the supplementary inlet valve and the throttle valve, to effect a progression in the degree of opening of the throttle valve relative to the discharge outlet, while maintaining the blanking of the supplementary inlet during the forward actuation of the said valves; and yielding resistance means, having a movement for rearwardly actuating the first mentioned means, to effect the opening of the supplementary inlet, and having a continuing movement for rearwardly actuating the supplementary inlet valve, by means of the said first mentioned means, to effect a retrogression in the degree of opening of the supplementary inlet valve relative to the supplementary inlet, and for rearwardly actuating the throttle valve, by means of the aforesaid connection between the supplementary inlet valve and the throttle valve, to effect a retrogression in the degree of opening of the throttle valve relative to the discharge outlet.

4. A device of the class described, comprising a housing, forming a chamber, having a primary inlet, and having a supplementary inlet, and having a discharge outlet; a supplementary inlet valve seat, having a port formed therein; a supplementary inlet valve, having a port formed therein, for controlling the port formed in the valve seat, and having members of a slip connection formed thereon; a secondary valve, having a port formed therein, for controlling the ports formed in the supplementary inlet valve and in the valve seat, and having a slip connection member, having cooperative engagement with the slip connection members of the supplementary inlet valve, formed thereon, providing a lost motion connection between the secondary valve and the supplementary inlet valve; said slip connection member of the secondary valve being so positioned relative to the port formed in the secondary valve that a forward movement of the secondary valve, within the limits of the slip connection, will close the port formed in the supplementary inlet valve and thereby blank the port formed in the valve seat; and means for initially actuating the secondary valve in a forward direction, within the limits of the aforesaid slip connection between the secondary valve and the supplementary inlet valve, for closing the port formed in the supplementary inlet valve and thereby blanking the port formed in the valve seat, and for continuing the forward actuation of the secondary valve to effect, by means of the aforesaid slip connection, the forward motivation of the supplementary inlet valve to any position in which the ports formed in the supplementary inlet valve and in the valve seat will be in a desired degree of registry, while maintaining the closure of the supplementary inlet valve port and the blanking of the valve seat port by the secondary valve.

5. A device of the class described in claim 4, and yielding resistance means for rearwardly actuating the secondary valve, within the limits of the aforesaid slip connection, to a position in which the port formed in the secondary valve will be in register with the ports formed in the supplementary inlet valve and in the valve seat, without motivation of the supplementary inlet valve or change in the adjustment of the supplementary inlet valve port relative to the valve seat port.

6. A device of the class described in claim 4, and yielding resistance means for rearwardly actuating the secondary valve, within the limits of the aforesaid slip connection, to a position in which the secondary valve port will be in register with the ports formed in the supplementary inlet valve and valve seat, and for continuing the rearward actuation of the secondary valve to effect, by means of the aforesaid slip connection, the rearward movement of the supplementary inlet valve to any position in which a desired degree of registry may be effected between the supplementary inlet valve and valve seat ports, while maintaining the secondary valve port in full degree of registry with the supplementary inlet valve port during such rearward actuation of the supplementary inlet valve.

7. A device of the class described in claim 4, and a washer, of lesser circumferential area than the circumferential area of the secondary and supplementary inlet valves, being interposed between the said valves and providing a slight clearance, forming an air space, between that portion of the contiguous faces of the said valves not in engagement with this washer.

8. A device of the class described, comprising a housing, forming a chamber, having a primary inlet, and having a supplementary inlet, and having a discharge outlet; a supplementary inlet valve, having a port formed therein, for controlling the supplementary inlet, and having members of a slip connection formed thereon; a secondary valve, having a port formed therein, for controlling the port formed in the supplementary inlet valve, and having a slip connection member, having cooperative engagement with the slip connection members of the supplementary inlet valve, formed thereon, providing a lost motion connection between the secondary valve and the supplementary inlet valve; said slip connection member of the secondary valve being so positioned relative to the port formed in the secondary valve that a forward movement of the secondary valve, within the limits of the slip connection, will close the port formed in the supplementary inlet valve and thereby blank the supplementary inlet, and so positioned relative to the port formed in the secondary valve that a rearward movement of the secondary valve, within the limits of the slip connection, will bring the secondary valve port into registry with the port formed in the supplementary inlet valve and thereby open the supplementary inlet; means for initially actuating the secondary valve in a forward direction, within the limits of the aforesaid slip connection, to a position for closing the supplementary inlet valve port and thereby blanking the supplementary inlet, and for continuing the forward movement of the secondary valve to effect, by means of the aforesaid slip connection, the forward motivation of the supplementary inlet valve, and thereby effecting a progression of registry between the supplementary inlet valve port and the supplementary inlet, for opening the supplementary inlet, while maintaining the blanking of the supplementary inlet by the secondary valve during the forward motivation of the supplementary inlet valve relative to the supplementary inlet; and yielding resistance means for opposing the forward actuation of the said first mentioned means.

9. A device of the class described, comprising a housing, forming a chamber, having a primary inlet, and having a supplementary inlet, and having a discharge outlet; a throttle valve for controlling the discharge outlet; a supplementary inlet valve, having a port formed therein, for controlling the supplementary inlet, and having members of a slip connection formed thereon; a connection between the supplementary inlet valve and the throttle valve, for operating the throttle valve in unison with the supplementary inlet valve; a secondary valve, having a port formed therein, for controlling the port formed in the supplementary inlet valve, and having a slip connection member, having cooperative engagement with the slip connection members of the supplementary inlet valve, providing a lost motion connection between the secondary valve and the supplementary inlet valve, formed thereon; said slip connection member of the secondary valve being so positioned relative to the port formed in the secondary valve that a forward movement of the secondary valve, within the limits of the slip connection, will close the port formed in the supplementary inlet valve and thereby blank the supplementary inlet; and being so positioned relative to the port formed in the secondary valve that a subsequent rearward movement of the secondary valve, within the limits of the slip connection, will bring the secondary valve port into register with the port formed in the supplementary inlet valve, and thereby unblank the supplementary inlet; means for initially actuating the secondary valve in a forward direction, within the limits of the aforesaid slip connection, to a position in which the secondary valve will close the port formed in the supplementary inlet valve, thereby blanking the supplementary inlet, and for continuing the forward actuation of the secondary valve to effect, by means of the aforesaid slip connection, the forward motivation of the supplementary inlet valve relative to the supplementary inlet, providing a progression of registry between the port formed in the supplementary inlet valve and the supplementary inlet, and for forwardly actuating the throttle valve, by means of the aforesaid connection between the supplementary inlet valve and the throttle valve, providing a progression in the degree of opening of the discharge outlet, while maintaining the closure of the supplementary inlet valve port and the blanking of the supplementary inlet by the secondary valve during the forward actuation of the supplementary inlet valve and throttle valve; and yielding resistance means for rearwardly actuating the first mentioned means, to effect the rearward motivation of the secondary valve, within the limits of the aforesaid slip connection, to a position in which the secondary valve port will be in register with the supplementary inlet valve port and with the supplementary inlet, without rearward motivation of the supplementary inlet valve or of the throttle valve during such rearward adjustment of the secondary valve relative to the supplementary inlet valve.

10. A device of the class described, comprising a housing, forming a chamber, having a primary inlet, and having a supplementary inlet, and having a discharge outlet; a duplex valve, consisting of a primary movable member, for controlling the supplementary inlet, and of a secondary movable member, for controlling the primary movable member; the said primary movable member having a port formed therein, and having members of a slip connection formed thereon; the secondary movable member having a slip connection member, having cooperative engagement with the slip connection members of the primary movable member, formed thereon, providing a lost motion connection between the secondary movable member and the primary movable member; said slip connection members of the primary movable member being so positioned relative to the port formed in the primary movable member that a forward movement of the secondary movable member, within the limits of the slip connection, will close the port formed in the primary movable member and thereby blank the supplementary inlet; means for initially actuating the secondary movable member in a forward direction, within the limits of the aforesaid slip connection, to first effect the closure of the port formed in the primary movable member, thereby blanking the supplementary inlet, and for continuing the forward actuation of the secondary movable member to effect, by means of the aforesaid slip connection, the forward motivation of the primary movable member, for progressively increasing the degree of opening of the primary movable member relative to the supplementary inlet, while maintaining the blanking of the supplementary inlet by the secondary movable member; and yielding resistance means for opposing the blanking of the supplementary inlet by the secondary movable member.

11. A device of the class described, comprising a housing, forming a chamber, having a primary inlet, and having a supplementary inlet, and having a discharge outlet; a throttle valve for controlling the discharge outlet; a duplex valve, consisting of a primary movable member and a secondary movable member, for controlling the supplementary inlet; the said primary movable member having a port formed therein, and having members of a slip connection with the secondary movable member formed thereon, providing a lost motion connection between the movement of the secondary movable member and the movement of the primary movable member; said slip connection members of the primary movable member being so positioned relative to the port formed in the primary movable member that a forward movement of the secondary movable member, within the limits of the slip connection, will close the port formed in the primary movable member and thereby blank the supplementary inlet; the said secondary movable member having a port formed therein for controlling the port formed in the primary movable member, and having a slip connection member, having cooperative engagement with the slip connection members of the primary movable member, formed thereon; said slip connection member of the secondary movable member being so positioned relative to the port formed in the secondary movable member that a rearward movement of the secondary movable member, within the limits of the slip connection, will bring the port formed in the secondary movable member into register with the port formed in the primary movable member, and thereby unblank the supplementary inlet; a connection between one of the movable members of the duplex valve and the throttle valve, for operating the throttle valve in unison with such member of the duplex valve; and means for initially actuating the secondary movable member of the duplex valve in a forward direction, within the limits of the aforesaid slip connection, to a position in which the secondary movable member closes the port formed in the primary movable member, thereby blanking the supplementary inlet, and for continuing the forward actuation of the secondary movable member to effect, by means of the aforesaid slip connection, the forward motivation of the primary movable member, providing a progression of registry between the port formed in the primary movable member and the supplementary inlet, and for forwardly motivating the throttle valve, by means of the said connection between one of the movable members of the duplex valve and the throttle valve, providing a progression in degree of opening of the discharge outlet, while maintaining the closure of the port formed in the primary movable member and the blanking of the supplementary inlet by the secondary movable member during the forward motivation of the primary movable member and of the throttle valve.

12. A device of the class described in claim 11, and yielding resistance means, rearwardly actuating the first mentioned means, for rearwardly motivating the secondary movable member of the duplex valve, within the limits of the aforesaid slip connection, to a position in which the port formed in the secondary movable member will be in open register with the port formed in the primary movable member of the duplex valve and thereby open the supplementary inlet, without motivation of the primary movable member during such limited rearward movement of the secondary movable member.

13. A device of the class described in claim 11, and yielding resistance means, rearwardly actuating the first mentioned means, for rearwardly motivating the secondary movable member of the duplex valve, within the limits of the aforesaid slip connection, to a position in which the port formed in the secondary movable member will be in open register with the port formed in the primary movable member of the duplex valve and thereby open the supplementary inlet, and for continuing the rearward motivation of the secondary movable member to effect, by means of the aforesaid slip connection, the rearward motivation of the primary movable member relative to the supplementary inlet, and for rearwardly motivating the throttle valve, by means of the aforesaid connection between one of the movable members of the duplex valve and the throttle valve, relative to the discharge outlet, while maintaining the open registry between the port formed in the secondary movable member and the port formed in the primary movable member during the rearward motivation of the throttle valve.

14. A device of the class described in claim 11, and a washer, of lesser circumferential area than the circumferential area of the primary and secondary movable members of the duplex valve, interposed between the said primary and secondary members and providing a slight clearance, forming an air space, between that portion of the contiguous faces of the said primary and secondary members not in engagement with this washer; and pressure means for maintaining the secondary movable member of the duplex valve in engagement with the aforesaid washer and thereby maintain the said washer in engagement with the primary movable member of the duplex valve.

15. A device of the class described, comprising a housing, forming a chamber, having a primary inlet, and having a supplementary inlet, and having a discharge outlet; a throttle valve for variably controlling the discharge outlet; a duplex valve, consisting of primary and secondary movable members, for variably controlling the degree of opening of the supplementary inlet; a connection between one of the said movable members of the duplex valve and the throttle valve, for operating the throttle valve in unison with such member of the duplex valve; and means for adjusting the secondary movable member of the duplex valve with relation to the primary movable member of the duplex valve, and for operating the throttle valve in unison with that movable member of the duplex valve having the aforesaid connection with the throttle valve, by means of such connection.

16. A device of the class described, comprising a housing, forming a chamber, having a primary inlet, and having a supplementary inlet, and having a discharge outlet; a throttle valve for variably controlling the degree of opening of the discharge outlet; a duplex valve, consisting of primary and secondary movable members, for variably controlling the degree of opening of the supplementary inlet; a connection between one of the movable members of the duplex valve and the throttle valve, for operating the throttle valve in unison with such movable member of the duplex valve; means for forwardly adjusting the secondary movable member of the duplex valve with relation to the primary movable member of the duplex valve, and for forwardly operating the throttle valve in unison with that movable member of the duplex valve having the aforesaid connection with the throttle valve, by means of the said connection; and yielding resistance means for rearwardly adjusting the secondary movable member of the duplex valve with relation to the primary movable member of the duplex valve.

17. A device of the class described, comprising a housing, forming a chamber, having a primary inlet, and having a supplementary inlet, and having a discharge outlet; a throttle valve for variably controlling the degree of opening of the discharge outlet; a duplex valve, consisting of a primary movable member and a secondary movable member, for variably controlling the degree of opening of the supplementary inlet; said primary and secondary movable members of said duplex valve having cooperative slip connection members formed thereon, providing a lost motion connection between the secondary movable member and the primary movable member of said duplex valve, for the intermittent operation of the primary movable member by the secondary movable member of the said duplex valve; and means for adjusting the secondary movable member of the duplex valve with relation to the primary movable member of the duplex valve, within the limits of the aforesaid slip connection, and for operating the throttle valve in unison with that movable member of the duplex valve having the aforesaid connection with the throttle valve, by means of such connection.

18. A device of the class described in claim No. 17, and yielding resistance means for rearwardly adjusting the secondary movable member of the duplex valve with relation to the primary movable member of the duplex valve.

19. A device of the class described, comprising a housing, forming a chamber, having a primary inlet, and having a supplementary inlet, and having a discharge outlet; a supplementary inlet valve, having a port formed therein, for variably controlling the degree of opening of the supplementary inlet, and having members of a slip connection formed thereon; a secondary valve, having a port formed therein, for variably controlling the degree of opening of the port formed in the supplementary inlet valve and for variably controlling the degree of opening of the supplementary inlet; and having a slip connection member, having cooperative engagement with the slip connection members of the supplementary inlet valve, formed thereon, providing a lost motion connection between the secondary valve and the supplementary inlet valve; said slip connection member being so positioned relative to the port formed in the secondary valve that a forward movement of the secondary valve, within the limits of the aforesaid slip connection, will reduce the degree of opening of the port formed in the supplementary inlet valve, and thereby reduce the degree of opening of the supplementary inlet; and means for initially actuating the secondary valve in a forward direction, within the limits of the aforesaid slip connection between the secondary valve and the supplementary inlet valve, for reducing the degree of opening of the port formed in the supplementary inlet valve and thereby reducing the degree of opening of the supplementary inlet, and for continuing the forward actuation of the secondary valve to effect, by means of the aforesaid slip connection, the forward motivation of the supplementary inlet valve to any position in which the port formed in the supplementary inlet valve will be in the desired degree of registry with the supplementary inlet, while maintaining the reduced degree of opening of the supplementary inlet valve port and the reduced degree of opening of the supplementary inlet.

EARL D. PEERSTONE.